US011283300B1

(12) United States Patent
Campbell

(10) Patent No.: US 11,283,300 B1
(45) Date of Patent: Mar. 22, 2022

(54) VEHICULAR CIGARETTE BATTERY CHARGER USING RESONANT INDUCTIVE COUPLING

(71) Applicant: Armani Campbell, Dallas, TX (US)

(72) Inventor: Armani Campbell, Dallas, TX (US)

( * ) Notice: Subject to any disclaimer, the term of this patent is extended or adjusted under 35 U.S.C. 154(b) by 15 days.

(21) Appl. No.: 16/922,060

(22) Filed: Jul. 7, 2020

(51) Int. Cl.
| | | |
|---|---|---|
| H02J 50/00 | (2016.01) | |
| H02J 50/12 | (2016.01) | |
| H02J 7/02 | (2016.01) | |
| G06K 7/10 | (2006.01) | |
| H02J 7/00 | (2006.01) | |
| B60R 16/033 | (2006.01) | |

(52) U.S. Cl.
CPC .......... *H02J 50/12* (2016.02); *B60R 16/033* (2013.01); *G06K 7/10297* (2013.01); *H02J 7/0042* (2013.01); *H02J 7/0047* (2013.01); *H02J 7/02* (2013.01)

(58) Field of Classification Search
CPC .... H02J 50/12; B60R 16/033; G06K 7/10297
USPC ....................................... 320/108
See application file for complete search history.

(56) References Cited

U.S. PATENT DOCUMENTS

| | | | |
|---|---|---|---|
| 7,868,585 B2 | 1/2011 | Sarnowsky | |
| 8,854,176 B2 | 10/2014 | Zeine | |
| 9,130,394 B2 | 9/2015 | Burdo | |
| 9,130,397 B2 | 9/2015 | Leabman | |
| D796,446 S | 9/2017 | Hahn | |
| 9,917,469 B2 | 3/2018 | Kiester | |
| 10,899,316 B1* | 1/2021 | Moeller | ........... G06Q 20/40145 |
| 2008/0079388 A1* | 4/2008 | Sarnowsky | ............. H02J 7/025 |
| | | | 320/103 |
| 2014/0269649 A1* | 9/2014 | Lockerbie | ............. H04W 88/16 |
| | | | 370/338 |
| 2016/0276865 A1* | 9/2016 | Pike | .......................... H02J 7/14 |
| 2017/0079056 A1* | 3/2017 | Sakwa | ....................... H02J 7/00 |
| 2020/0328603 A1* | 10/2020 | Walker | .................. H02J 7/0044 |
| 2020/0361355 A1* | 11/2020 | Chen | ....................... B60R 16/03 |

FOREIGN PATENT DOCUMENTS

WO 2015006128 1/2015

* cited by examiner

*Primary Examiner* — Suchin Parihar
(74) *Attorney, Agent, or Firm* — Kyle A. Fletcher, Esq.

(57) ABSTRACT

The vehicular cigarette battery charger using resonant inductive coupling is a power distribution device. The vehicular cigarette battery charger using resonant inductive coupling is configured for use with a personal data device. The vehicular cigarette battery charger using resonant inductive coupling is configured for use with a vehicle. Specifically, the vehicular cigarette battery charger using resonant inductive coupling forms an electrical connection with the battery of the electric system of the vehicle. The vehicular cigarette battery charger using resonant inductive coupling comprises an inductive charging system. The resonant charging system receives electric energy from the vehicle battery and transmits the electrical energy in the form of electromagnetic radiation to the personal data device. The personal data device converts the energy received from the electromagnetic radiation into a chemical potential energy that is stored in the battery of the personal data device.

18 Claims, 4 Drawing Sheets

VEHICULAR CIGARETTE BATTERY CHARGER USING RESONANT INDUCTIVE COUPLING

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity including the distribution of electric power, more specifically, a circuit arrangement for the wireless supply and distribution of electric power. (H20J50/40).

SUMMARY OF INVENTION

The vehicular cigarette battery charger using resonant inductive coupling is a power distribution device. The vehicular cigarette battery charger using resonant inductive coupling is configured for use with a personal data device. The vehicular cigarette battery charger using resonant inductive coupling is configured for use with a vehicle. Specifically, the vehicular cigarette battery charger using resonant inductive coupling forms an electrical connection with the battery of the electric system of the vehicle. The vehicular cigarette battery charger using resonant inductive coupling comprises an inductive charging system. The resonant charging system receives electric energy from the vehicle battery and transmits the electrical energy in the form of electromagnetic radiation to the personal data device. The personal data device converts the energy received from the electromagnetic radiation into a chemical potential energy that is stored in the battery of the personal data device.

These together with additional objects, features and advantages of the vehicular cigarette battery charger using resonant inductive coupling will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular cigarette battery charger using resonant inductive coupling in detail, it is to be understood that the vehicular cigarette battery charger using resonant inductive coupling is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular cigarette battery charger using resonant inductive coupling.

It is therefore important that the claims be regarded as including such equivalent construction insofar as they do not depart from the spirit and scope of the vehicular cigarette battery charger using resonant inductive coupling. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
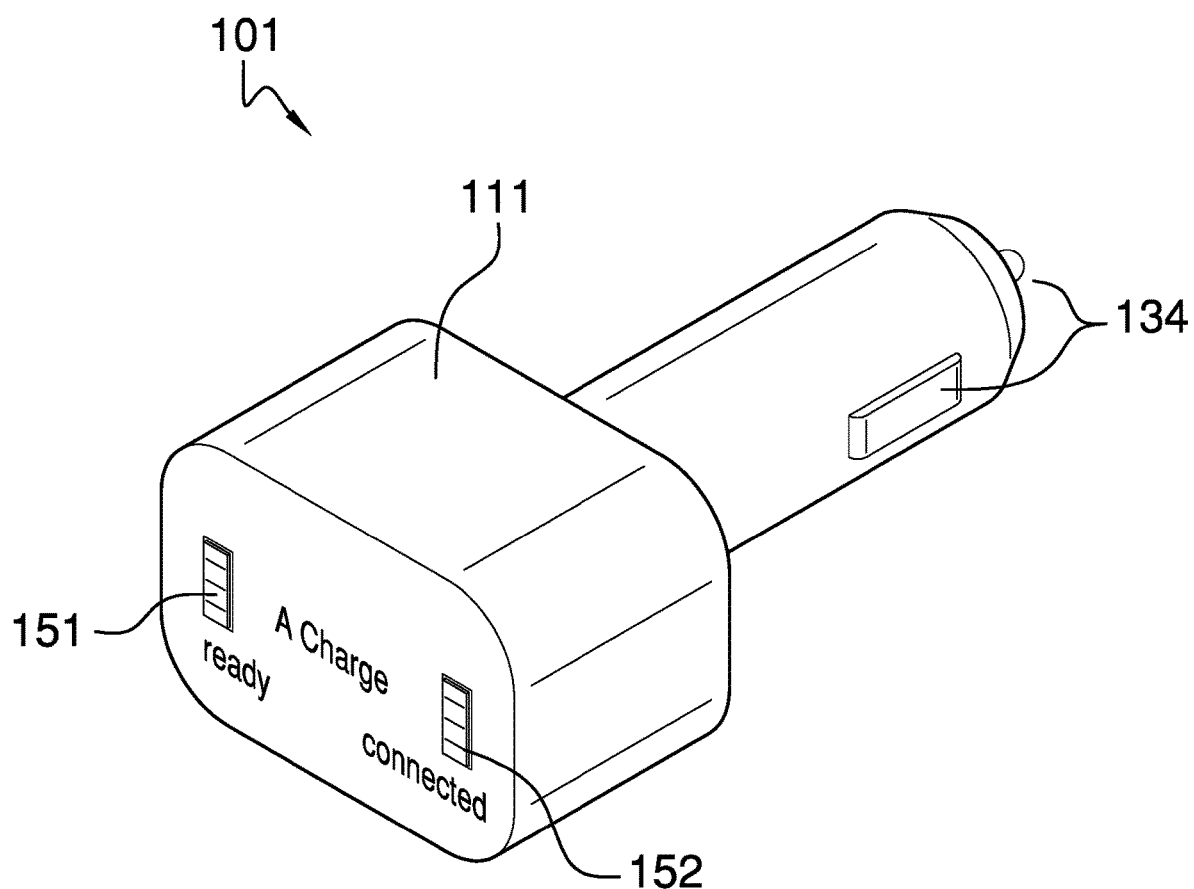
FIG. 1 is a perspective view of an embodiment of the disclosure.
Figure 2:
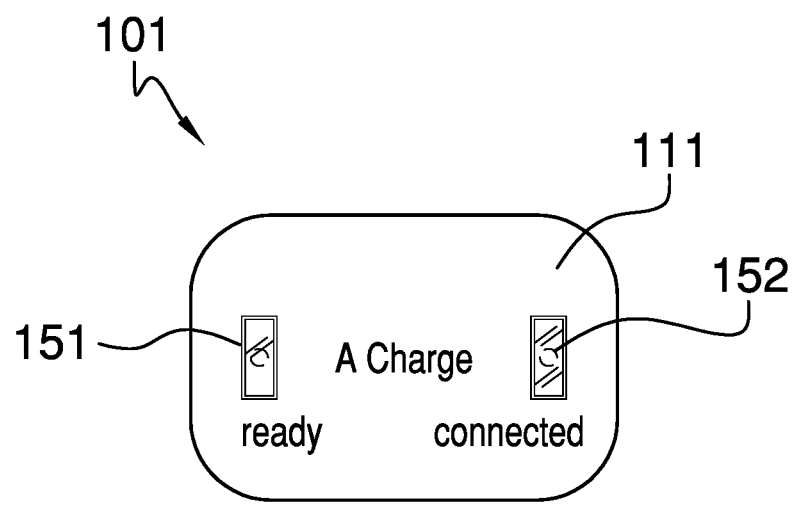
FIG. 2 is a front view of an embodiment of the disclosure.
Figure 3:
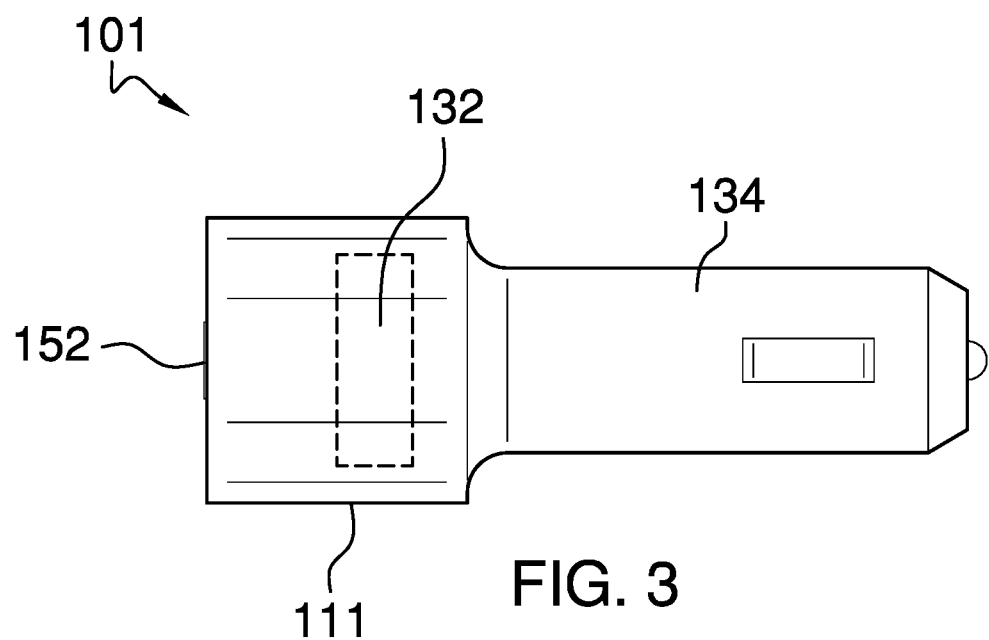
FIG. 3 is a side view of an embodiment of the disclosure.
Figure 4:
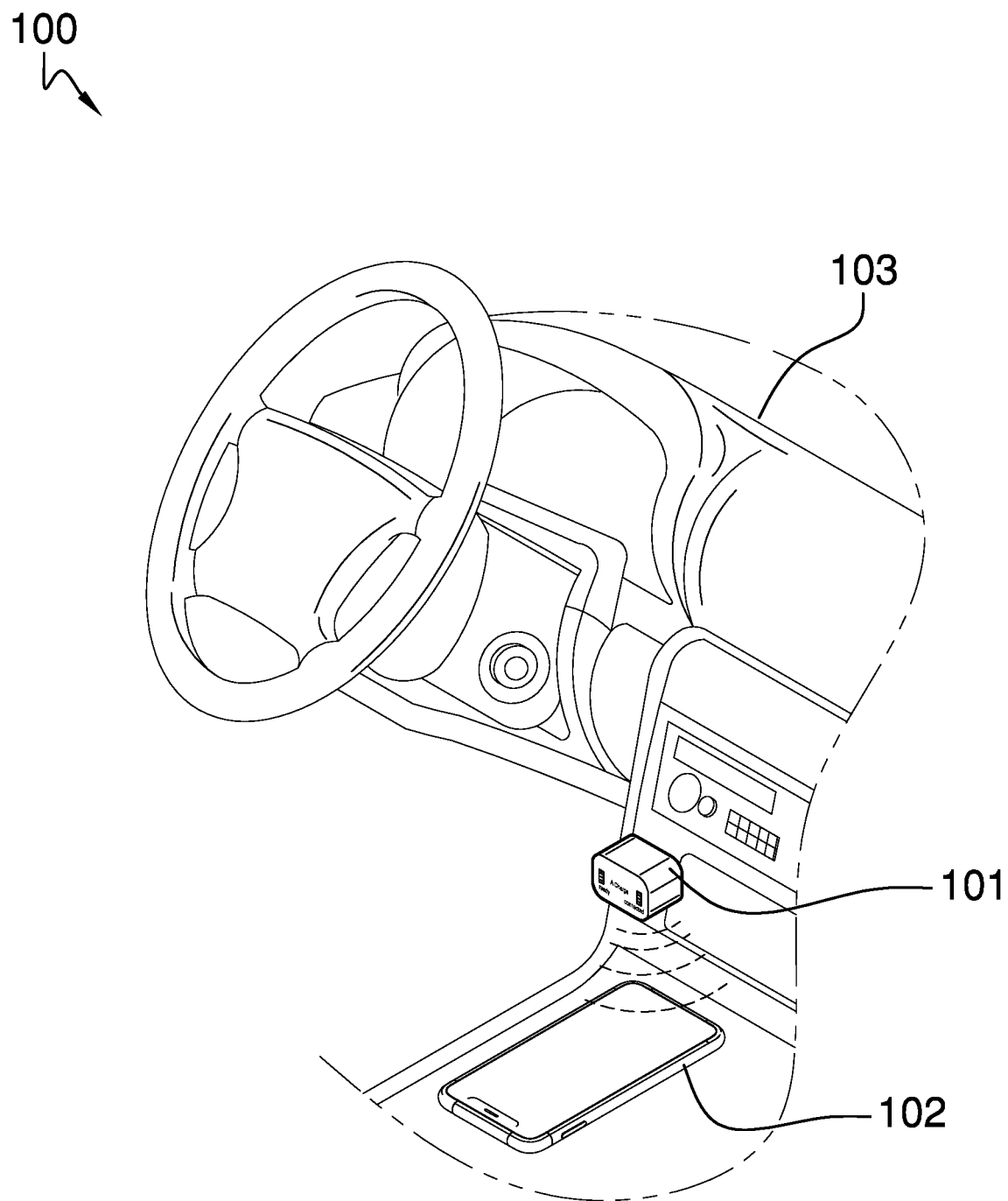
FIG. 4 is an in-use diagram of an embodiment of the disclosure.
Figure 5:
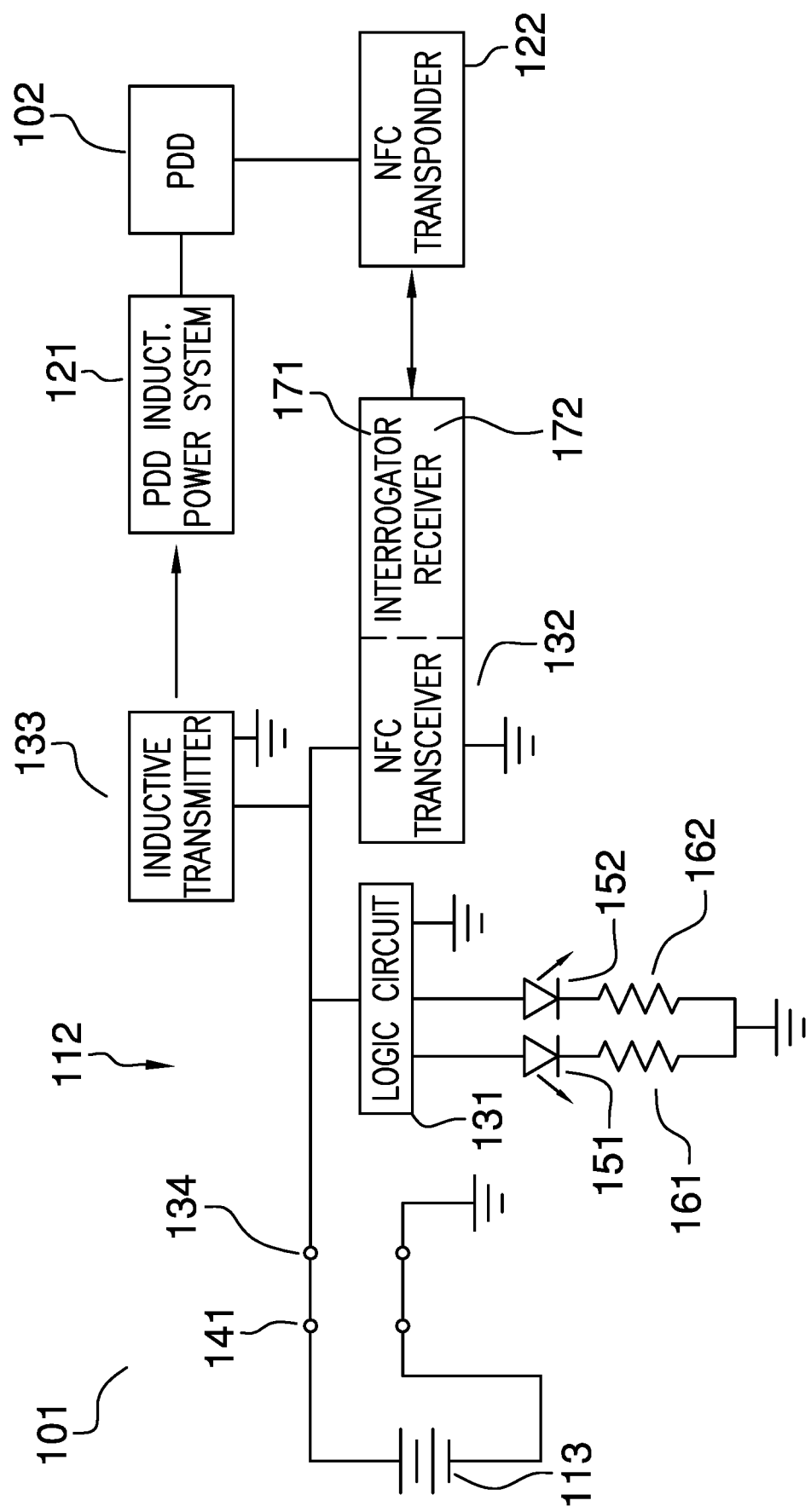
FIG. 5 is a block diagram of an embodiment of the disclosure.

Detailed reference will now be made to one or more potential embodiments of the disclosure, which are illustrated in FIGS. 1 through 5.

The vehicular cigarette battery charger using resonant inductive coupling 100 (hereinafter invention) is a power distribution device. The invention 100 is configured for use with a personal data device 102. The invention 100 is configured for use with a vehicle 103. Specifically, the invention 100 forms an electrical connection with the battery 113 of the electric system of the vehicle 103. The invention 100 comprises an inductive charging system 101. The inductive charging system 101 receives electric energy from the vehicle battery 113 and transmits the electrical energy in the form of electromagnetic radiation to the personal data device 102. The personal data device 102 converts the energy received from the electromagnetic radiation into a chemical potential energy that is stored in the battery of the personal data device 102.

The vehicle 103 is defined elsewhere in this disclosure. The vehicle 103 further comprises a vehicle 103 battery 113. The vehicle 103 battery 113 is an external power source. The vehicle 103 battery 113 is provisioned with the vehicle 103.

The vehicle 103 battery 113 further comprises a charging port 141. The charging port 141 is an electrical termination that provides external access to the electric energy stored in the vehicle 103 battery 113.

The personal data device 102 is a programmable electrical device that provides data management and communication services through one or more functions referred to as an application. The application is a set of logical operating instructions that are performed by the personal data device 102. The addition of an application will provide increased functionality for the personal data device 102. This disclosure assumes that an application exists for the purpose of interacting with the invention 100. Methods to design and implement an application on a personal data device 102 are well known and documented in the electrical arts. The personal data device 102 is well-known and documented in our society. The personal data device 102 is defined elsewhere in this disclosure. The personal data device 102 comprises a PDD inductive power system 121 and a PDD NFC transponder 122. The PDD inductive power system 121 electrically connects to the personal data device 102. The PDD NFC transponder 122 electrically connects to the personal data device 102.

The PDD inductive power system 121 is an electrical circuit. The PDD inductive power system 121 is provisioned with the personal data device 102. The PDD inductive power system converts the electromagnetic radiation transmitted by the inductive charging system 101 into electrical energy used to operate the personal data device 102. The PDD inductive power system 121 inductively couples with the inductive charging system 101 to form what is commonly referred to as a wireless charging system. The design and use of a PDD inductive power system 121 is well-known and documented in the electrical arts.

The PDD NFC transponder 122 is a RFID tracking tag that is contained in the personal data device 102. The PDD NFC transponder 122 is provisioned with the personal data device 102 as part of a near field communication system used to support a token based identification system commonly used to support token based payment systems. The RFID technology, token based identification technology, and the near field communication technology are well known and documented in the electrical arts. The RFID technology, token based identification technology, and the near field communication technology are defined in greater detail elsewhere in this disclosure. The PDD NFC transponder 122 receives an electromagnetic signal, known as an "interrogation signal", from the inductive charging system 101 and reflects the interrogation signal back to the inductive charging system 101.

The inductive charging system 101 detects the reflected interrogation signal and interprets the detection of the reflected interrogation signal as in indication that the personal data device 102 is within the effective charging range of the inductive charging system 101. The use of near field communication technology to operate the PDD NFC transponder 122 ensures that the personal data device 102 is within the effective charging range of the inductive charging system 101 before the inductive charging system 101 detects the presence of the personal data device 102.

The inductive charging system 101 is an electrical device. The inductive charging system 101 draws energy from the vehicle 103 battery 113 and converts the energy into electromagnetic radiation. The electromagnetic radiation generated by the inductive charging system 101 is transmitted to the personal data device 102. The electromagnetic radiation transmitted by the inductive charging system 101 provides the energy used to operate the PDD inductive power system 121 of the personal data device 102. The inductive charging system 101 generates a first visual indication that the inductive charging system 101 is electrically connected to the vehicle 103 battery 113. The inductive charging system 101 generates a second visual indication that the inductive charging system 101 is transmitting electromagnetic radiation to the personal data device 102. The inductive charging system 101 comprises a charging housing 111, a charging circuit 112, and a vehicle 103 battery 113. The charging circuit 112 and the vehicle 103 battery 113 are electrically interconnected.

The charging housing 111 is a rigid structure. The charging housing 111 contains the charging circuit 112. The charging housing 111 is formed with all apertures and form factors necessary to allow the charging housing 111 to accommodate the use, the operation, and the external connections of the charging circuit 112. Methods to form a charging housing 111 suitable for the purposes described in this disclosure are well-known and documented in the mechanical arts.

The charging circuit 112 is an electrical circuit. The charging circuit 112 draws electric energy from the vehicle 103 battery 113. The charging circuit 112 converts the drawn electric energy into electromagnetic radiation. The charging circuit 112 transmits the electromagnetic radiation to the PDD inductive power system 121 of the personal data device 102. The charging circuit 112 monitors the environment for the presence of the personal data device 102 while the charging circuit 112 is electrically connected to the vehicle 103 battery 113. The charging circuit 112 illuminates the first visual indication when the charging circuit 112 electrically connects to the vehicle 103 battery 113. The charging circuit 112 illuminates the second visual indication when the charging circuit 112 detects the presence of the personal data device 102. The charging circuit 112 comprises a logic circuit 131, an NFC transceiver 132, an inductive transmitter 133, and a charging plug 134.

The logic circuit 131 is an electric circuit. The logic circuit 131 monitors the NFC transceiver 132 for the detection of the reflected interrogation signal from the PDD NFC transponder 122 of the personal data device 102. The logic circuit 131 illuminates the first visual indication when the logic circuit 131 electrically connects to the vehicle 103 battery 113 through the charging plug 134. The logic circuit 131 illuminates the second visual indication when the logic circuit 131 detects that the NFC transceiver 132 has received from the reflected interrogation signal from the PDD NFC transponder 122 of the personal data device 102. The logic circuit 131, the NFC transceiver 132, the inductive transmitter 133, and the charging plug 134 are electrically interconnected.

The logic circuit 131 further comprises a first LED 151, a second LED 152, a first limit resistor 161, and a second limit resistor 162. The first LED 151, the second LED 152, the first limit resistor 161, and the second limit resistor 162 are electrically interconnected. The logic circuit 131 controls the operation of the first LED 151, the second LED 152, the first limit resistor 161, and the second limit resistor 162.

The first LED 151 is a light emitting diode. The logic circuit 131 controls the operation of the first LED 151. The logic circuit 131 illuminates the first LED 151 when the logic circuit 131 electrically connects to the vehicle 103 battery 113. The first limit resistor 161 is a resistor the electrically connects in series between the first LED 151 and the electrical ground provided by the vehicle 103 battery 113. The first limit resistor 161 limits the flow of current through the first LED 151.

The second LED 152 is a light emitting diode. The logic circuit 131 controls the operation of the second LED 152. The logic circuit 131 illuminates the second LED 152 when the logic circuit 131 detects that the RFID receiver 172 of the NFC transceiver 132 has received a reflected interrogation signal. The second limit resistor 162 is a resistor the electrically connects in series between the second LED 152 and the electrical ground provided by the vehicle 103 battery 113. The second limit resistor 162 limits the flow of current through the second LED 152.

The NFC transceiver 132 is an electrical device. The NFC transceiver 132 transmits an interrogation signal at regular intervals in an effort to identify the presence of the personal data device 102 within the effective charging range of the inductive charging system 101. The NFC transceiver 132 receives the reflected interrogation signal from the personal data device after its reflection by the PDD NFC transponder 122 of the personal data device 102. The NFC transceiver 132 electrically connects to the logic circuit 131 such that the logic circuit 131 monitors the NFC transceiver 132 for the detection of the reflected interrogation signal. The NFC transceiver 132 is a commercially available technology that is well-known and documented in the RFID arts. The NFC transceiver 132 further comprises a RFID interrogator 171 and a RFID receiver 172.

The RFID interrogator 171 is an electrical circuit. The RFID interrogator 171 generates and transmits the interrogation signal in an effort to find the personal data device 102. The RFID receiver 172 receives the reflected interrogation signal from the PDD NFC transponder 122 of the personal data device 102 such that the logic circuit 131 detects the receipt of the reflected interrogation signal.

The inductive transmitter 133 is an electrical device. The inductive transmitter 133 generates and transmits the electromagnetic radiation used as an energy source by the PDD inductive power system 121 to power the operation of the personal data device 102. The inductive transmitter 133 is a commercially available technology that is well-known and documented in the electrical arts.

The charging plug 134 forms an electrical connection between the charging circuit 112 and the vehicle 103 battery 113 that draws electric energy from the vehicle 103 battery 113 into the charging circuit 112. The charging plug 134 is a cigarette lighter plug. The cigarette lighter plug is defined elsewhere in this disclosure. The charging plug 134 inserts into the charging port 141 to form the electrical connection between the charging circuit 112 and the vehicle 103 battery 113.

The following definitions were used in this disclosure:

Cigarette Lighter Plug: As used in this disclosure, a cigarette lighter plug is a standardized electrical connection that attaches an electrically powered device to the electric power system of a vehicle.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Housing: As used in this disclosure, a housing is a rigid structure that encloses and protects one or more devices.

Induction: As used in this disclosure, induction refers to a process where a first process selected from the group consisting of an electric current or an electromagnetic field generates or interacts with a second process selected from the group consisting of an electric current or an electromagnetic field.

LED: As used in this disclosure, an LED is an acronym for a light emitting diode. A light emitting diode is a diode that is also a light source.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is programmable.

Near Field Communication: As used in this disclosure, near field communication, commonly referred to as NFC, is an RFID technology and communication protocol that is commonly implemented on personal data devices.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Receiver: As used in this disclosure, a receiver is an electric device that is used to receive and demodulate electromagnetic radiation such as radio signals.

RFID: As used in this disclosure, RFID refers to Radio Frequency Identification technology. RFID is a wireless technology that uses an electromagnetic field to identify and retrieve data from RFID tracking tags that are placed on or near an object.

RFID Interrogator: As used in this disclosure, an RFID interrogator is a device that transmits a radio signal at a frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Token Based Identification System: As used in this disclosure, a token based identification system is an electronic identification system wherein an interrogator maintained by a first party or a first device. The assumption is that the first party or a first device requires identification. The interrogator is used to interrogate a token held within the possession of a second party or second device to identify the second party or the second device. In response to the interrogation, the second party or the second device provides identification information to the first party or a first device. A system associated with the interrogator validates the identity of the second party or the second device using the identification information provided by the token. Once the identification is validated, the interrogator will take an action based on validated identification. A common example of this technology is a near field communication system, which is often referred to as a contactless system. In this system, a personal data device is used as the token. The interrogator will interrogate the personal data device using RFID technology and authorize a payment or data transfer based on the validated identification received from the personal data device.

Token Based Payment System: As used in this disclosure, a token based payment is an electronic payment system wherein an interrogator maintained by the receiver of the payment interrogates a token held by the maker of the payment. The token is interrogated by the interrogator to identify the payer. Once the payer is identified, a system associated with the interrogator will confirm the identity of payee through information received from the token and based on that identification receive an electronic payment based on the confirmed identity. A common example of this technology is a near field communication payment system, which is often referred to as a contactless system. In this system, a personal data device of the payee is used as the token. The interrogator will interrogate the personal data device using RFID technology.

Transceiver: As used in this disclosure, a transceiver is a device that is used to generate, transmit, and receive electromagnetic radiation such as radio signals.

Transmitter: As used in this disclosure, a transmitter is a device that is used to generate and transmit electromagnetic radiation such as radio signals.

Transponder: As used in this disclosure, a transponder is a device designed to receive a radio signal and automatically transmit a different radio signal. In this disclosure, RFID tracking tags will be referred to as transponders.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A resonant charging system comprising
an inductive charging system;
wherein the resonant charging system is a power distribution device;
wherein the resonant charging system is configured for use with a personal data device;
wherein the resonant charging system is configured for use with a vehicle;
wherein the resonant charging system forms an electrical connection with the battery of the electric system of the vehicle;
wherein the inductive charging system receives electric energy from the vehicle battery and transmits the electrical energy in the form of electromagnetic radiation to the personal data device;
wherein the personal data device uses the energy received from the electromagnetic radiation to power the personal data device;
wherein the vehicle battery further comprises a charging port;
wherein the charging port is an electrical termination that provides external access to the electric energy stored in the vehicle battery;
wherein the inductive charging system is an electrical device;
wherein the inductive charging system draws energy from the vehicle battery and converts the energy into electromagnetic radiation;
wherein the electromagnetic radiation generated by the inductive charging system is transmitted to the personal data device;
wherein the electromagnetic radiation transmitted by the inductive charging system provides the energy used to operate the PDD inductive power system of the personal data device;
wherein the inductive charging system generates a first visual indication that the inductive charging system is electrically connected to the vehicle battery;
wherein the inductive charging system generates a second visual indication that the inductive charging system is transmitting electromagnetic radiation to the personal data device.

2. The resonant charging system according to claim 1 wherein the personal data device is a programmable electrical device that provides data management and communication services.

3. The resonant charging system according to claim 2
wherein the personal data device further comprises a PDD inductive power system and a PDD NFC transponder;
wherein the PDD inductive power system electrically connects to the personal data device;
wherein the PDD NFC transponder electrically connects to the personal data device.

4. The resonant charging system according to claim 3
wherein the PDD inductive power system is an electrical circuit;

wherein the PDD inductive power system is provisioned with the personal data device;

wherein the PDD inductive power system converts the electromagnetic radiation transmitted by the inductive charging system into the electrical energy used to operate the personal data device.

5. The resonant charging system according to claim 4 wherein the PDD NFC transponder is an RFID tracking tag that is contained in the personal data device;

wherein the PDD NFC transponder is provisioned with the personal data device as part of a near field wherein the PDD NFC transponder receives an interrogation signal from the inductive charging system and reflects the interrogation signal back to the inductive charging system.

6. The resonant charging system according to claim 5 wherein the inductive charging system detects the reflected interrogation signal and interprets the detection of the reflected interrogation signal as in indication that the personal data device is within the effective charging range of the inductive charging system.

7. The resonant charging system according to claim 6 wherein the inductive charging system comprises a charging housing, a charging circuit, and the vehicle battery;

wherein the charging circuit and the vehicle battery are electrically interconnected.

8. The resonant charging system according to claim 7 wherein the charging housing contains the charging circuit;

wherein the charging housing is a rigid structure.

9. The resonant charging system according to claim 8 wherein the charging circuit is an electrical circuit;

wherein the charging circuit draws electric energy from the vehicle battery;

wherein the charging circuit converts the drawn electric energy into electromagnetic radiation;

wherein the charging circuit transmits the electromagnetic radiation to the PDD inductive power system of the personal data device;

wherein the charging circuit monitors the environment for the presence of the personal data device while the charging circuit is electrically connected to the vehicle battery;

wherein the charging circuit illuminates the first visual indication when the charging circuit electrically connects to the vehicle battery;

wherein the charging circuit illuminates the second visual indication when the charging circuit detects the presence of the personal data device.

10. The resonant charging system according to claim 9 wherein the charging circuit comprises a logic circuit, an NFC transceiver, an inductive transmitter, and a charging plug;

wherein the logic circuit, the NFC transceiver, the inductive transmitter, and the charging plug are electrically interconnected.

11. The resonant charging system according to claim 10 wherein the logic circuit is an electric circuit;

wherein the logic circuit monitors the NFC transceiver for the detection of the reflected interrogation signal from the PDD NFC transponder of the personal data device;

wherein the logic circuit illuminates the first visual indication when the logic circuit electrically connects to the vehicle battery through the charging plug;

wherein the logic circuit illuminates the second visual indication when the logic circuit detects that the NFC transceiver has received from the reflected interrogation signal from the PDD NFC transponder of the personal data device.

12. The resonant charging system according to claim 11 wherein the logic circuit further comprises a first LED, a second LED, a first limit resistor, and a second limit resistor;

wherein the first LED, the second LED, the first limit resistor, and the second limit resistor are electrically interconnected;

wherein the logic circuit controls the operation of the first LED, the second LED, the first limit resistor, and the second limit resistor.

13. The resonant charging system according to claim 12 wherein the first LED is a light emitting diode;

wherein the logic circuit controls the operation of the first LED;

wherein the logic circuit illuminates the first LED when the logic circuit electrically connects to the vehicle battery;

wherein the second LED is a light emitting diode;

wherein the logic circuit controls the operation of the second LED;

wherein the logic circuit illuminates the second LED when the logic circuit detects that the RFID receiver of the NFC transceiver has received a reflected interrogation signal.

14. The resonant charging system according to claim 13 wherein the first limit resistor is a resistor the electrically connects in series between the first LED and the electrical ground provided by the vehicle battery;

wherein the first limit resistor limits the flow of current through the first LED;

wherein the second limit resistor is a resistor the electrically connects in series between the second LED and the electrical ground provided by the vehicle battery;

wherein the second limit resistor limits the flow of current through the second LED.

15. The resonant charging system according to claim 14 wherein the NFC transceiver is an electrical device;

wherein the NFC transceiver transmits an interrogation signal at regular intervals;

wherein the NFC transceiver receives the reflected interrogation signal from the personal data device after its reflection by the PDD NFC transponder of the personal data device;

wherein the NFC transceiver electrically connects to the logic circuit such that the logic circuit monitors the NFC transceiver for the detection of the reflected interrogation signal.

16. The resonant charging system according to claim 15 wherein the NFC transceiver further comprises an RFID interrogator and an RFID receiver;

wherein the RFID interrogator is an electrical circuit;

wherein the RFID interrogator generates and transmits the interrogation signal to find the personal data device;

wherein the RFID receiver receives the reflected interrogation signal from the PDD NFC transponder of the personal data device such that the logic circuit detects the receipt of the reflected interrogation signal.

17. The resonant charging system according to claim 16 wherein the inductive transmitter is an electrical device;

wherein the inductive transmitter generates and transmits the electromagnetic radiation used as an energy source by the PDD inductive power system to power the operation of the personal data device.

18. The resonant charging system according to claim 17
wherein the charging plug forms an electrical connection
   between the charging circuit and the vehicle battery
   that draws electric energy from the vehicle battery into
   the charging circuit;
wherein the charging plug is a cigarette lighter plug;
wherein the charging plug inserts into the charging port to
   form the electrical connection between the charging
   circuit and the vehicle battery.

* * * * *